United States Patent [19]

Cain et al.

[11] Patent Number: 5,786,019
[45] Date of Patent: Jul. 28, 1998

[54] HEALTHY SPREAD FATS

[75] Inventors: Frederick William Cain, Voorburg, Netherlands; Kevin Warren Smith, Bedford, Great Britain; Nico Zwikstra, Heemstede, Netherlands

[73] Assignee: Loders-Croklaan B.V., Wormerveer, Netherlands

[21] Appl. No.: 612,900

[22] PCT Filed: Aug. 31, 1994

[86] PCT No.: PCT/EP94/02893

§ 371 Date: Mar. 5, 1996

§ 102(e) Date: Mar. 5, 1996

[87] PCT Pub. No.: WO95/07619

PCT Pub. Date: Mar. 23, 1995

[30] Foreign Application Priority Data

Sep. 14, 1993 [EP] European Pat. Off. ............ 93307252

[51] Int. Cl.$^6$ ............................................. A23D 9/00
[52] U.S. Cl. ............................................. 426/607; 426/603
[58] Field of Search ............................. 426/606, 607, 426/603

[56] References Cited

U.S. PATENT DOCUMENTS

| | | |
|---|---|---|
| 4,883,684 | 11/1989 | Yang . |
| 5,288,513 | 2/1994 | Cain ........................... 426/660 |
| 5,324,533 | 6/1994 | Cain ........................... 426/607 |
| 5,342,644 | 8/1994 | Cain ........................... 426/660 |
| 5,366,752 | 11/1994 | Cain ........................... 426/607 |
| 5,385,744 | 1/1995 | Cain ........................... 426/606 |
| 5,424,091 | 6/1995 | Cain ........................... 426/607 |
| 5,431,948 | 7/1995 | Cain ........................... 426/660 |
| 5,476,676 | 12/1995 | Cain ........................... 426/607 |
| 5,554,408 | 9/1996 | Cain ........................... 426/606 |
| 5,576,045 | 11/1996 | Cain ........................... 426/607 |

FOREIGN PATENT DOCUMENTS

| | | |
|---|---|---|
| 209 176 | 1/1987 | European Pat. Off. . |
| 326 198 | 8/1989 | European Pat. Off. . |
| 430 870 | 6/1991 | European Pat. Off. . |
| 502 697 | 9/1992 | European Pat. Off. . |
| 633 684 | 12/1982 | Switzerland . |
| 91 09533 | 7/1991 | WIPO . |
| 91 15126 | 10/1991 | WIPO . |
| 94 12045 | 6/1994 | WIPO . |
| 92/07619 | 3/1995 | WIPO . |

OTHER PUBLICATIONS

Gunstone 1983 Lipids in Foods Chemistry, Biochemistry and Technology Pergamon Press New York pp. 152–154.

*Primary Examiner*—Carolyn Paden
*Attorney, Agent, or Firm*—Pillsbury Madison & Sutro LLP

[57] ABSTRACT

Fat-compositions that display the following characteristics are very suitable fats for healthy margarines or spreads: (I): 5–45 wt % $S_2U$ triglycerides; 0–60 wt % $SU_2$; 5–95 wt % $U_3$; 0–8 wt % $S_3$; S=saturated fatty acid: $C_{16}$–$C_{24}$, U=unsaturated fatty acid $C_{18}+$; (II): $(C_{18}-C_{24}):C_{16}>0.3$; (III): <5% diglycerides; (IV): % SAFA<35 wt %; (V): $N_5$=12–30, $N_{35}$<7, $(N_5-N_{20})$<10.

14 Claims, No Drawings

HEALTHY SPREAD FATS

This application is the National Stage of International Application PCT/EP94/02893, filed Aug. 31, 1994.

BACKGROUND OF THE INVENTION

Fats, suitable for use in margarine or spreads have been the subject of many studies in the past. According to U.S. Pat. No. 4,425,371 margarine fats comprise (1) a randomly interesterified mixture of a) an oil high in linoleic acid (=$C_{18:2}$) and b) an oil or fat high in saturated fatty acids with at least 16 carbon atoms and (2) an olein fraction obtained after a fractionation of above interesterified mixture, which olein fraction has to have a specific N-line. Although the fats obtained display good properties as margarine-fats, those fats have the disadvantage that its N-line is not optimal. In particular its $N_5$ values and the differences between $N_5$ and $N_{20}$ are too high to make them good healthy spread-fats. Further its content of saturated fatty acids is still rather high. Moreover, these fats include fractions obtained after a hydrogenation. As hydrogenation will result in the formation of trans-fats, the margarine-blends in general will contain some of those undesirable trans fats. Another disadvantage is that for the preparation of the fat blends a rather complicated process must be performed, including an interesterification, a hydrogenation, a fractionation and a back-blending of the different products obtained.

Other known margarine-fats contain appreciable amounts of lauric acids. The presence of lauric residues, however, has a negative impact on the flavour of the products, because of hydrolysis that occurs during storage.

Recently a margarine oil low in trans-acids was disclosed in WO 91/08677. According to this documents the fats must fulfil the following requirements:

(1) they must contain 84–95% triglycerides (2) and also 5–15% of diglycerides (3) less than 3% trans-acids should be present (4) less than 6% intermediate saturated fatty acids should be present (5) 25–45% of esterified $C_{18:2}$ should be present (6) 0–11% of esterified $C_{18:3}$ should be present (7) 5–25% of esterified $C_{18:1}$ should be present (8) the fatty acid distribution should be non-random, so that the esterified $C_{18:0}$ present is mainly bonded at 1 and/or 3 and esterified unsaturated fatty acid is mainly bonded at 2-position of the triglycerides (9) the fat must have a specific solid fat profile.

According to the specification the presence of diglycerides is essential in order to obtain a good mouthfeel and the required solid fat profile. We have found, that the presence of diglycerides in margarine-fats has a negative impact on the crystallization behaviour (in particular: the velocity of crystallization) of the fats, when applied in margarines or spreads. Therefore, we have studied, whether we could find healthy fats suitable for the preparation of margarines or spreads that are substantially free of diglycerides and laurics, have a low SAFA-content, while its N-line is such, that the fats are good structuring fats at refrigerator-temperature (So:$N_5$) and at ambient temperature (So:$N_{20}$ or better its $N_5$–$N_{20}$), while they melt well in the mouth (So:$N_{35}$).

SUMMARY OF THE INVENTION

We found fat-compositions that fulfil above requirements. Therefore our invention concerns with fat-composition, suitable for healthy margarines or spreads, comprising the following triglyceride-distribution:

5–45 wt % $S_2U$-triglycerides

0–60 wt % $SU_2$-triglycerides

5–95 wt % $U_3$-triglycerides

0–8 wt % $S_3$-triglycerides

S being: saturated fatty acid with 16–24 carbon atoms

U being: mono- or polyunsaturated fatty acids with at least 18 carbon atoms which fat-composition has a weight-ratio-($C_{18}$–$C_{24}$):($C_{16}$ saturated fatty acids of at least 0.3, contains less than 5 wt % diglycerides, while its SAFA-content is less than 35 wt % and its solid fat content, measured by NMR-pulse (unstabilized), is:

$N_5$: 12–30

$N_{35}$: less than 7

($N_5$–$N_{20}$): less than 10

A preferred triglyceride-composition comprises:

10–25 wt % $S_2U$

5–40 wt % $SU_2$

50–84 wt % $U_3$

1–5 wt % $S_3$

Our novel fats preferably have SAFA-contents of less than 30 wt %, most preferably less than 25 wt %. The SAFA-content being defined as the total weight of saturated fatty acids (including the trans-acids) over the weight of all fatty acids present. The preferred N-line (measured by NMR-pulse, not stabilized; i.e. using the following T-regime melt at 80° C.; 10 min. at 60° C.; 1 hr at 0° C., measured at measure-T after 30 min. at this T) is $N_5$: 12–18

$N_{35}$<3

($N_5$–$N_{20}$)<5

DETAILED DESCRIPTION OF INVENTION

All kind of fats, such as natural fats or oils but also synthesized fat-components can be applied in our compositions. Examples of these fats are the following triglycerides: sunflower oil; olive oil; soybean oil; corn oil; PPO; StStO; BBO; PStP; PBO; PPLn; StStLn; BBLn; PBLn; StOSt; POSt; POP; BOB; StOO; POO; BOO; BLnB; StLnSt; PLnSt; PLnP; palm oil stearin; $St_3$; $P_3$; $B_3$; $S_3$, wherein S can be any combination of $C_{16}$–$C_{24}$; $O_3$; $Ln_3$; $LnO_2$; $Ln_2O$; (P=$C_{16:0}$;

St:$C_{18:0}$; B=$C_{22:0}$; O=$C_{18:1}$; Ln=$C_{18:2}$). It is, however, preferred to apply fats and fat mixtures that result in a behenic acid content in the composition of at least 1.5 wt %, preferably at least 4 wt %. Very suitable fat-compositions are obtained, when we apply a blend of fat components (A), (B) and (C), wherein:

(A) has an SUS level of more than 30 wt %, preferably more than 45 wt % and displays an $N_{20}$>20, preferably above 45

(B) has an $S_3$ level above 45 wt %, preferably above 60 wt %

(C) has an ($U_2S$+$U_3$) level above 45 wt %, preferably above 60 wt % while (A), (B) and (C) are present in amounts of 5–40 wt % (A), 0–10 wt % (B) and 50–95 wt % (C). The amounts of components (A), (B) and (C) are advantageously 15–25 wt % (A); 0.5–3 st % (B) and 70–90 wt % (C).

Component (A) can be made by chemical or enzymic interesterification of a liquid oil and a saturated fatty acid, optionally followed by fractionation. Enzymically made fats (A) are preferred, in particular fats made by enzymic interesterification of a fatty acid having 16–24 carbon atoms and a liquid oil. The $N_{25}$ (unstabilized) of those fats A is preferably more than 45, most preferably more than 55.

Fat (A) suitably is a shea fraction, illipe, or a fat having a high content of at least one of the triglycerides:

BOB; BLnB; AOA; AOB or a cocoa butter equivalent ($A=C_{20:0}$).

A very convenient fat (B) is a palm oil stearin. This will be rich in tripalmitics.

Fat or oil (C) can be any liquid oil high in ($SU_2+U_3$). Examples are sunflower oil, olive oil, soybean oil, corn oil.

In a preferred embodiment of our invention the fat composition contains the triglycerides SUS and SSU in a weight-ratio of more than 0.6, preferably more than 1.0, most preferably more than 5.0.

Spreads with a fat content of 20–80 w %, comprising at least part of the fats according to the invention are also part of the invention. These spreads display a hardness according to Haighton at 20° C. of more than 50, preferably more than 120.

The spreads can be made by using conventional techniques for the preparation of margarines or low fat spreads (cf. EP 89082)

EXAMPLES

1. Sunflower oil was blended with a fat, containing 65.4 wt % SLnS, wherein $S=C_{14}-C_{24}$, while St was present at 54.4 wt % in a weight-ratio of 85 SF: 15 StLnSt rich fat. The triglyceride-composition of this blend was:

| | |
|---|---|
| $S_2U$: | 16.8 wt % |
| $SU_2$: | 13.0 wt % |
| $U_3$: | 69.7 wt % |
| $S_3$: | 0.5 wt % |

Its SAFA-content was 20.2 wt %, while it displayed the following N-profile:

| |
|---|
| $N_5 = 12$ |
| $N_{35} = 0$ |
| $N_5-N_{20} = 7.5$ |

The StLnSt applied was obtained by an enzymic conversion (1.3. specific) of sunflower oil and stearic acid, followed by fractionation.

2. Sunflower oil, palm oil stearin and StLnSt were blended in a weight ratio of:

78 SF, 3 palm oil stearin and 19 StLnSt-rich fat
The triglyceride composition of this blend was:

| | |
|---|---|
| $S_2U$: | 21.3 wt % |
| $SU_2$: | 12.2 wt % |
| $U_3$: | 64 wt % |
| $S_3$: | 2.6 wt % |

Its SAFA-content was 24.7 wt %, while it displayed the following N-profile:

| |
|---|
| $N_5 = 17.4$ |
| $N_{35} = 0$ |
| $N_5-N_{20} = 7.2$ |

The StLnSt-rich fat applied was obtained by an enzymic conversion (1.3) of sunflower oil and stearic acid, followed by fractionation. Its StLnSt content was 60 wt %

3. Sunflower oil, palm oil stearin, BOB-rich fat and BOO-rich fat were blended in a weight ratio of 55 SF, 5 palm oil stearin, 20 BOB-rich fat and 20 BOO-rich fat. Its triglyceride-composition was:

| | |
|---|---|
| $S_2U$: | 26.3 |
| $SU_2$: | 23.8 |
| $U_3$: | 45.3 |
| $S_3$: | 4.4 |

The SAFA-content of this blend was 34.0 wt %, while it displayed the following N-profile:

| |
|---|
| $N_5 = 28.1$ |
| $N_{35} = 1.8$ |
| $N_5-N_{20} = 5.2$ |

The BOB-rich fat and BOO-rich fat were obtained by an 1.3-enzyme-specific conversion of high oleic sunflower oil and behenic acid, followed by fractionation into two products. The products obtained contained 73 wt % BOB and 64.1 wt % SOO (behenic content was: 37 wt %).

4. A margarine was made, using the fatblend of example 3 the following recipe was applied:

| | wt % |
|---|---|
| Fatphase | |
| fat-blend | 83.1 |
| emulsifier | 0.3 |
| colour/flavour | 0.05 |
| Waterphase | |
| water | 16.0 |
| S.M.P. | 0.4 |
| preservative | 0.05 |
| organic acid | 0.04 |
| pH = 4.7 | |

A premix was made form the components; the premix was pasteurized at 85° C. and cooled to 45° C. the premix was led through an ACA-system, applying a throughput of 40 g/min. The A, C and A-units were stirred at respectively 800, 400 and 600 rpm. The outlet-temperatures were: 16.7° C.; 17.4° C. and 14.7° C.

A margarine was obtained with the hardness (C-values in g/cm² after 3 days storage at T indicated) as given in the table below.

| C-values of the margarines | | |
|---|---|---|
| Example | C at 5° C. | C at 20° C. |
| 5 | >3000 | 2340 |

5. Halvarines were made, using 2 different fat blends, i.e. the fatblend of example 2; and a commercial, low-SAFA blend. (=13% inter-esterified hardened palm oil/hardened palm-kernel and 87% sunflower oil). The following recipe was applied:

|  | wt % |
|---|---|
| Fatphase | |
| fatblend | 40.0 |
| emulsifier | 0.3 |
| colour/flavour | 0.05 |
| Waterphase | |
| water | 56.4 |
| S.M.P. | 1.5 |
| gelatin | 1.5 |
| preservative | 0.15 |
| organic acid | 0.07 |
| pH = 5.1 | |

A premix was made from the components; the premix was pasteurized at 85° C. and cooled to 45° C. The premix was led through an ACA-system, using stirring-speeds of 800, 1300 and 600 rpm. The throughput was 40 g/min. The following exit-temperatures were used:

| using: | A | C | A |
|---|---|---|---|
| fat of example 2 | 16.4 | 22.3 | 15.4 |
| in Es-fat | 13.2 | 19.1 | 14.6 |

The products obtained displayed the following C-values:

| Fatblend | $C_5$ | $C_{15}$ |
|---|---|---|
| example 2 | 200 | 80 |
| in Es-fat | 85 | 67 |

So the hardness of our new products is slightly higher than the hardness when using a commercial fat blend.

6. Fat blends were made with the composition as given in the table below. The properties of the fat blends are given in this table as well.

| Fat phase | $N_5$ | $N_{35}$ | $N_5-N_{20}$ | SAFA | $S_3$ | $S_2U$ | $SU_2$ | $U_3$ | $\dfrac{C_{18}-C_{24}}{C_{16}}$ |
|---|---|---|---|---|---|---|---|---|---|
| 20% St Ln St 80 Sunflower oil | 16.7 | 0 | 7.9 | 23 | 0.7 | 21.3 | 12.6 | 65.6 | 15.1 |
| 7.5% BlnB 10% StlnSt 82.5% Sunflower oil | 15.0 | 0 | 8.1 | 22 | 0.7 | 19.2 | 12.8 | 67.6 | 17.1 |
| 15% BOB 85% Sunflower oil | 14.9 | 6.5 | 1.8 | 20.8 | 0.8 | 16.6 | 12.9 | 69.7 | 19.3 |
| 15% BlnB 85% Sunflower oil | 14.5 | 5.7 | 1.5 | 21.0 | 0.7 | 17.0 | 13.0 | 69.7 | 13.2 |

We claim:

1. Fat-composition, suitable for healthy margarines or spreads, comprising the following triglyceride-distribution:

5–45 wt % $S_2U$-triglycerides
0–60 wt % $SU_2$-triglycerides
5–95 wt % $U_3$-triglycerides
0–8 wt % $S_3$-triglycerides S being: saturated fatty acid with 16–24 carbon atoms U being: mono- or polyunsaturated fatty acids with at least 18 carbon atoms, said fat-composition has a weight ratio $C_{18}$–$C_{24}$-saturated fatty acids; $C_{16}$-saturated fatty acids of at least 0.3; is substantially free of laurics; contains less than 5 wt % diglycerides, the total weight of saturated fatty acids plus trans acids (SAFA) divided by the weight of all fatty acids present is less than 35 wt % and its solid fat content, measured by NMR-pulse (unstabilized), is:

| $N_5$: | 12–30 |
|---|---|
| $N_{35}$: | less than 7 |
| $(N_5-N_{20})$: | less than 10 | and wherein the composition is a blend of fat components (A), (B) and (C),
wherein:
(A) has an SUS level of more than 30 wt %, and displays an $N_{20}$>20.
(B) has an $S_3$ level above 45 wt %.
(C) has an $(U_2S+U_3)$ level above 45 wt %, while (A), (B) and (C) are present in amounts of 5–40 wt % (AM), 0–10 wt % (B) and 50–95 wt % (C).

2. Fat-composition according to claim 1, wherein the triglyceride-distribution comprises:

10–25 wt % $S_2U$
5–40 wt % $SU_2$
50–84 wt % $U_3$
1–5 wt % $S_3$.

3. Fat-composition according to claim 1, wherein the SAFA-content is less than 30 wt %.

4. Fat-composition according to claim 1, wherein the solid fat-content is:

$N_5$: 12–18
$N_{35}$<3
$(N_5-N_{20})$<5.

5. Fat-composition according to claim 1, wherein the fat composition contains at least 1.5 wt % of behenic acid.

6. Fat-composition according to claim 1, wherein the composition is a blend of at least two of the following triglycerides: sunflower oil; olive oil; corn oil; soybean oil; StOSt; POSt; POP; BOB; StOO; POO; BOO; BLnB; StLnSt; PLnSt; PLnP; palm oil stearin; $St_3$; $P_3$; $B_3$; $O_3$; $Ln_3$; $LnO_2$; $Ln_2O$ (P=$C_{16:0}$; St:$C_{18:0}$; B=$C_{22:0}$; O=$C_{18:1}$; Ln=$C_{18:2}$).

7. Fat-composition according to claim 1, wherein (A), (B) and (C) are present in amounts of 15–25 wt %, 0.5–3 wt % and 70–90 wt %.

8. Fat-composition according to claim 1, wherein fat-component (A) is made by enzymic interesterification of a fatty acid, having 16–24 carbon atoms and a liquid oil.

9. Fat-composition according to claim 1, wherein fat-component (A) displays an $N_{25}$>45.

10. Fat-composition, according to claim 1 wherein fat-component (B) is a palm oil stearin.

11. Fat-composition according to claim 1, wherein fat A is a shea fraction, illipe, a fat having a high content of at least one of the triglycerides: BOB, BLnB, AOA; AOB or a cocoa butter equivalent (A=$C_{20:0}$).

12. A fat-composition according to claim 1, wherein (A) has an SUS level of more than 45 wt %, (B) has an $S_3$ level above 60 wt %, and (C) has an ($U_2S+U_3$) level above 60 wt %.

13. A fat-composition according to claim 1, wherein the SAFA-content is less than 25 wt % and fat component A displays an $N_{25}$>55.

14. A fat-composition according to claim 1 containing at least 4 wt % behenic acid.

* * * * *